US011139626B2

(12) United States Patent
Sato

(10) Patent No.: US 11,139,626 B2
(45) Date of Patent: Oct. 5, 2021

(54) THERMOCOMPRESSION APPARATUS AND METHOD OF MANUFACTURING ELECTRONIC DEVICE

(71) Applicant: TDK CORPORATION, Tokyo (JP)

(72) Inventor: Koki Sato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 521 days.

(21) Appl. No.: 15/982,211

(22) Filed: May 17, 2018

(65) Prior Publication Data

US 2018/0351315 A1 Dec. 6, 2018

(30) Foreign Application Priority Data

May 30, 2017 (JP) .............................. JP2017-106436

(51) Int. Cl.
| | | |
|---|---|---|
| *B23K 20/00* | (2006.01) | |
| *H01R 43/02* | (2006.01) | |
| *H01F 27/24* | (2006.01) | |
| *B23K 20/02* | (2006.01) | |
| *H01F 27/29* | (2006.01) | |
| *H01R 43/20* | (2006.01) | |
| *H01F 27/28* | (2006.01) | |

(Continued)

(52) U.S. Cl.
CPC ....... *H01R 43/0249* (2013.01); *B23K 20/025* (2013.01); *H01F 27/24* (2013.01); *H01F 27/29* (2013.01); *H01R 43/20* (2013.01); *B23K 2101/36* (2018.08); *H01F 27/2823* (2013.01); *H01F 27/292* (2013.01); *H01F 41/10* (2013.01); *H01R 43/0263* (2013.01)

(58) Field of Classification Search
CPC ........ H01L 2224/85201; B23K 1/0016; B23K 20/004; B23K 20/025; B23K 2101/36; B23K 2101/40; B23K 2101/42; B23K 3/0623; B23K 3/08
See application file for complete search history.

(56) References Cited

U.S. PATENT DOCUMENTS

2011/0217826 A1* 9/2011 Sakurada .............. H01L 21/304
438/462

FOREIGN PATENT DOCUMENTS

| CN | 201910563 U | 7/2011 |
|---|---|---|
| JP | H05-291354 A | 11/1993 |
| JP | H08-125316 A | 5/1996 |

(Continued)

OTHER PUBLICATIONS

JP-2009260379-A computer english translation (Year: 2011).*

*Primary Examiner* — Erin B Saad
(74) *Attorney, Agent, or Firm* — Oliff PLC

(57) ABSTRACT

A thermocompression apparatus includes a stage and a heater chip. The stage includes an installation surface on which a component having a scheduled portion of thermocompression is placed. The heater chip is disposed to be freely movable to and from the scheduled portion of thermocompression of the component opposite to the installation surface of the stage and is configured to heat and press the scheduled portion of thermocompression. The installation surface includes a maximum convex and a pair of slope surfaces. The maximum convex is configured to contact with a bottom surface of the component. The pair of slope surfaces has heights decreasing respectively from the maximum convex toward both sides of the installation surface in a width direction of the component.

12 Claims, 14 Drawing Sheets

(51) Int. Cl.
*H01F 41/10* (2006.01)
*B23K 101/36* (2006.01)

(56) References Cited

FOREIGN PATENT DOCUMENTS

| | | | | | |
|---|---|---|---|---|---|
| JP | 2009260379 A | * | 11/2009 | ............. | H01L 24/83 |
| JP | 2016-149490 A | | 8/2016 | | |

* cited by examiner

THERMOCOMPRESSION APPARATUS AND METHOD OF MANUFACTURING ELECTRONIC DEVICE

BACKGROUND OF THE INVENTION

1. Field of the Invention

The present invention relates to a thermocompression apparatus used, for example, for connecting work of wires constituting a coil and a method of manufacturing an electronic device.

2. Description of the Related Art

For example, the apparatus shown in Patent Document 1 below is known as a thermocompression apparatus. In a normal thermocompression apparatus, as shown in Patent Document 1, a component having a scheduled portion of thermocompression to be pushed by a heater chip is bonded by thermocompression while being placed on a flat installation surface.

In conventional thermocompression apparatuses, there is no problem if thermocompression is carried out by pushing a heater chip against each scheduled portion of thermocompression in a single component. However, the following problem occurs if a heater chip pushes a plurality of scheduled portions of thermocompression in a single component so as to bond them by thermocompression at the same time using a conventional thermocompression apparatus. That is, only some of the plurality of scheduled portions of thermocompression are bonded by thermocompression, and the other scheduled portions of thermocompression are insufficiently bonded by thermocompression.

The compression states among the plurality of scheduled portions of thermocompression may be uneven due to, for example, unstable dimensional accuracy of parts. Specifically, if adjacent terminal portions have an uneven height in an electronic device with a plurality of terminals on its drum-core flanges, wires may easily have uneven states of thermocompression and may have connection failure.

Patent Document 1: JPH08-125316

SUMMARY OF THE INVENTION

The present invention has been achieved under such circumstances. It is an object of the invention to provide a thermocompression apparatus capable of favorably conducting thermocompression of a plurality of scheduled portions of thermocompression at the same time, and provide a method of manufacturing an electronic device including a step of conducting thermocompression using the thermocompression apparatus.

To achieve the above object, a thermocompression apparatus according to the present invention comprises:

a stage including an installation surface on which a component having a scheduled portion of thermocompression is placed; and a heater chip disposed to be freely movable to and from the scheduled portion of thermocompression of the component opposite to the installation surface of the stage and configured to heat and press the scheduled portion of thermocompression, wherein the installation surface comprises:

a maximum convex configured to contact with a bottom surface of the component; and a pair of slope surfaces whose heights decrease respectively from the maximum convex toward both sides of the installation surface in a width direction of the component.

A plurality of scheduled portions of thermocompression formed on the component is bonded by thermocompression in the following manner using the thermocompression apparatus according to the present invention. The following explanation presumes that the plurality of scheduled portions of thermocompression formed on the component has a different height based on manufacturing errors or so. Initially, the heater chip approaches the scheduled portions of thermocompression of the component arranged opposite to the installation surface of the stage. Then, the heater chip contacts with only one of the scheduled portions of thermocompression.

Moreover, the heater chip is pushed against the component, and the component tilts from the maximum convex of the installation surface toward one of the slope surfaces, whereby the other scheduled portion of thermocompression is moved closer to the heater chip. Thus, both of the scheduled portions of thermocompression can be favorably heated and pressed, while the heater chip is in contact with the scheduled portions of thermocompression arranged on both sides of the maximum convex of the installation surface.

In the thermocompression apparatus according to the present invention, the component thereby slantly rotates and moves on the installation surface of the stage with the maximum convex of the installation surface as a fulcrum in pushing the heater chip against the plurality of scheduled portions of thermocompression of the component, even if the component has manufacturing errors or so. That is, the heater chip presses one of the scheduled portions of thermocompression of the component, and this motion thereby slantly rotates and moves the component with the maximum convex of the installation surface as a fulcrum, and moves the other scheduled portion of thermocompression closer to the heater chip. Thus, the scheduled portions of thermocompression are positioned in a self-alignment manner with respect to the heater chip.

Thus, the scheduled portions of thermocompression arranged on both sides of the maximum convex of the installation surface favorably contact with the heater chip, and thermocompression failure or so can be thereby prevented effectively. In the thermocompression apparatus according to the present invention, the heater chip and the plurality of scheduled portions of thermocompression are not positioned by a tracking movement of the heater chip but by moving the component, which is smaller than the heater chip, in a self-alignment manner, and tracking properties of the positioning are thereby improved. It is unfavorable to control a minute movement of the heater chip, which is comparatively large, based on manufacturing errors and distortion of the component, because this complicates controlling and also complicates a connection mechanism between the heater chip and the mechanism supporting it.

Preferably, the component is placed on the installation surface so that the scheduled portions of thermocompression are respectively arranged on both sides of the maximum convex in the width direction. When such an arrangement is employed, the plurality of scheduled portions of thermocompression can be simultaneously and favorably bonded by thermocompression.

The installation surface may comprise a separately movable installation surface, and the maximum convex and the pair of slope surfaces may be formed on the movable installation surface. In this configuration, after the operation of thermocompression, the heater chip and the movable installation surface are separated from the component, the component can be held detachably by, for example, a chuck mechanism, and the chuck mechanism can rotate the component. In this case, a winding operation of wires can be continuously carried out after a connecting work of the wires by thermocompression, and work efficiency can be improved.

The thermocompression apparatus may comprise a control mechanism configured to control the chuck mechanism. The thermocompression apparatus may further comprise a rotation mechanism configured to rotate the chuck mechanism around a core axis of the component.

A method of manufacturing an electronic device according to the present invention comprises the steps of:

preparing a component having a plurality of scheduled portions of thermocompression;

placing the component on an installation surface of a stage so that one of the scheduled portions of thermocompression and the other scheduled portion of thermocompression are arranged on both sides of a maximum convex formed on the installation surface in a width direction thereof;

moving a heater chip closer to the scheduled portions of thermocompression of the component disposed opposite to the installation surface of the stage;

bringing the heater chip into contact with one of the scheduled portions of thermocompression, declining the component from the maximum convex toward one of slope surfaces of the installation surface, and moving the other scheduled portion of thermocompression closer to the heater chip; and conducting thermocompression by heating and pressing both of the scheduled portions of thermocompression while the heater chip is in contact with the scheduled portions of thermocompression on both sides of the maximum convex of the installation surface.

In the method of manufacturing an electronic device according to the present invention, the component slantly rotates and moves on the installation surface of the stage with the maximum convex of the installation surface as a fulcrum in pushing the heater chip against the plurality of scheduled portions of thermocompression of the component, even if the component has manufacturing errors or so. That is, the heater chip presses one of the scheduled portions of thermocompression of the component, and this motion thereby slantly rotates and moves the component with the maximum convex of the installation surface as a fulcrum, and moves the other scheduled portion of thermocompression closer to the heater chip. Thus, the scheduled portions of thermocompression are positioned in a self-alignment manner with respect to the heater chip.

Thus, the scheduled portions of thermocompression arranged on both sides of the maximum convex of the installation surface favorably contact with the heater chip, and thermocompression failure or so can be thereby prevented effectively.

DETAILED DESCRIPTION OF THE PREFERRED EMBODIMENT

Hereinafter, the present invention is described based on embodiments shown in figures.

First Embodiment

Figure 1A:
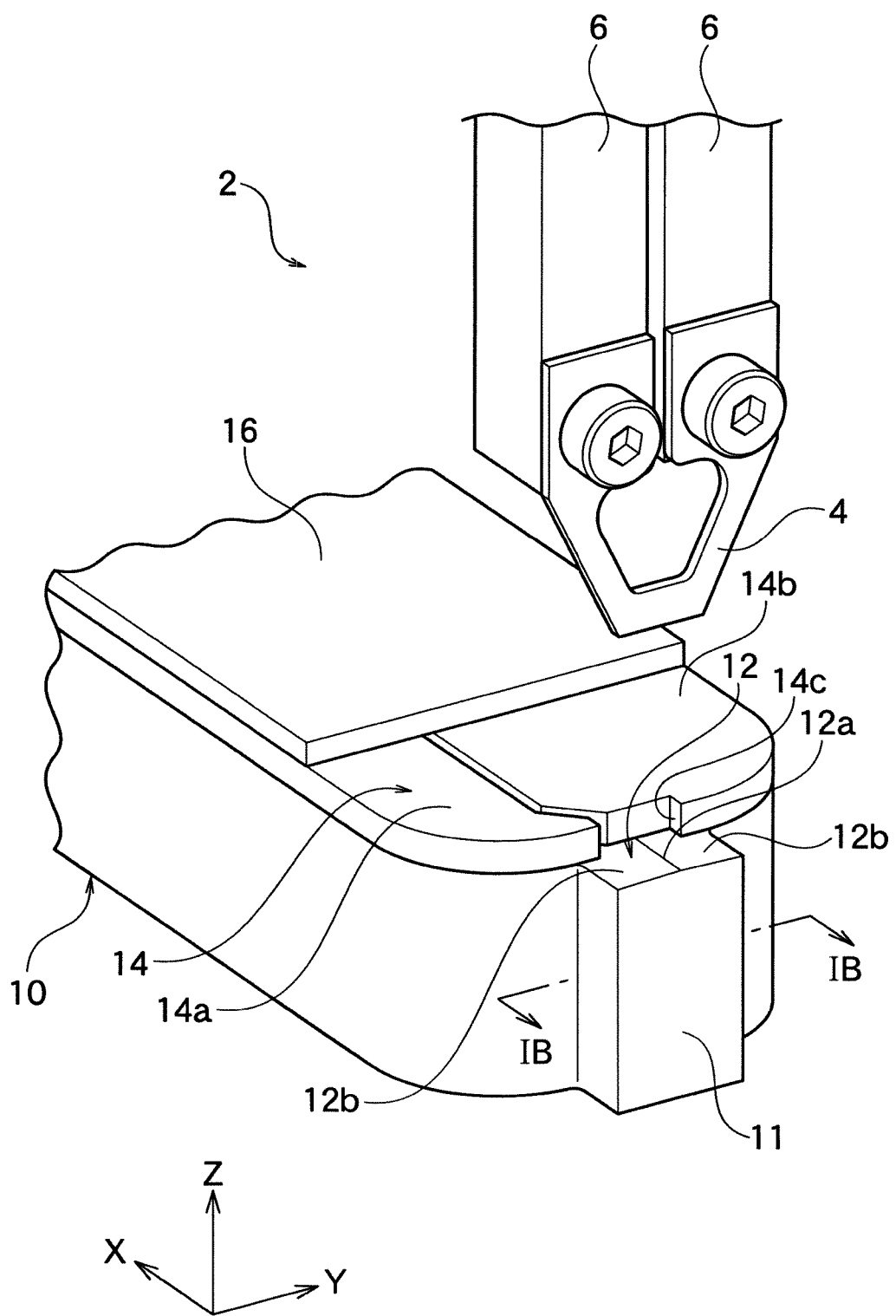
FIG. 1A is a perspective view of a main part of a thermocompression apparatus according to an embodiment of the present invention.
Figure 3:
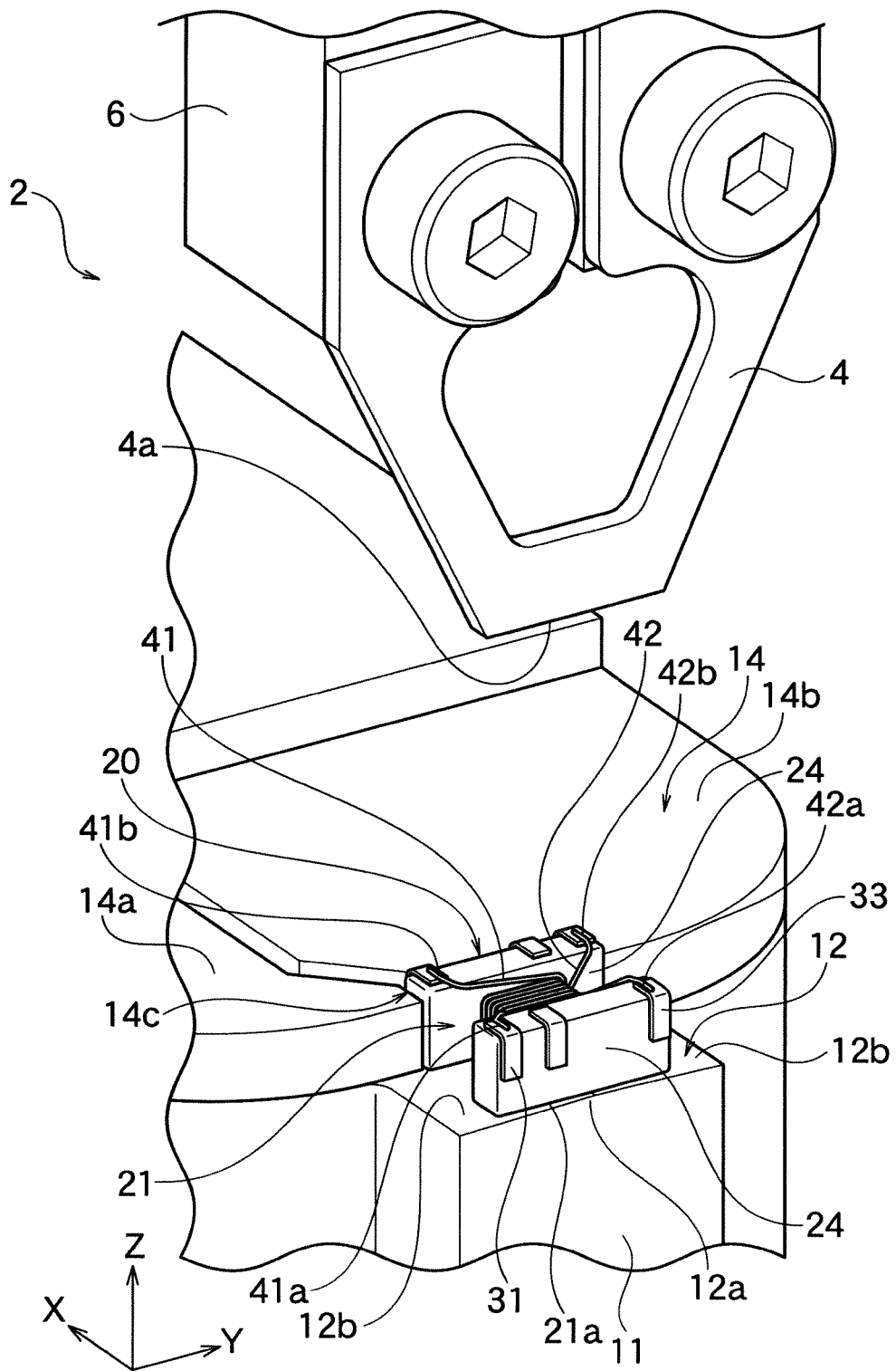
FIG. 3 is a perspective view of a main part showing a thermocompression step of the coil device shown in FIG. 2B.

As shown in FIG. 1A, a thermocompression apparatus 2 according to an embodiment of the present invention includes a chip support drive portion 6 and a stage 10. A heater chip 4 is attached to a lower part of the chip support drive portion 6 in the Z-axis direction. The stage 10 includes an installation stand 11. An installation surface 12 is formed on the top surface of the installation stand 11 in the Z-axis direction. As shown in FIG. 3, bottom surfaces 21a of a core 21 of a coil device 20 are disposed on the installation surface 12. The installation stand 11 with the installation surface 12 is made of any material, such as wear-resistant material of tungsten, cemented carbide, etc.

One of flanges 24 of the core 21 can be held from both sides in the Y-axis direction by a concave portion for chuck (chuck portion) 14c formed at tips of a pair of chuck pieces 14a and 14b in the X-axis direction constituting a chuck mechanism 14. Incidentally, the X-axis, the Y-axis, and the Z-axis in the figures are mutually approximately perpendicular to each other. The X-axis is approximately parallel to a core axis of a winding core of the coil device 20 mentioned below. The Y-axis is approximately parallel to a width direction of the coil device 20.

Figure 2A:
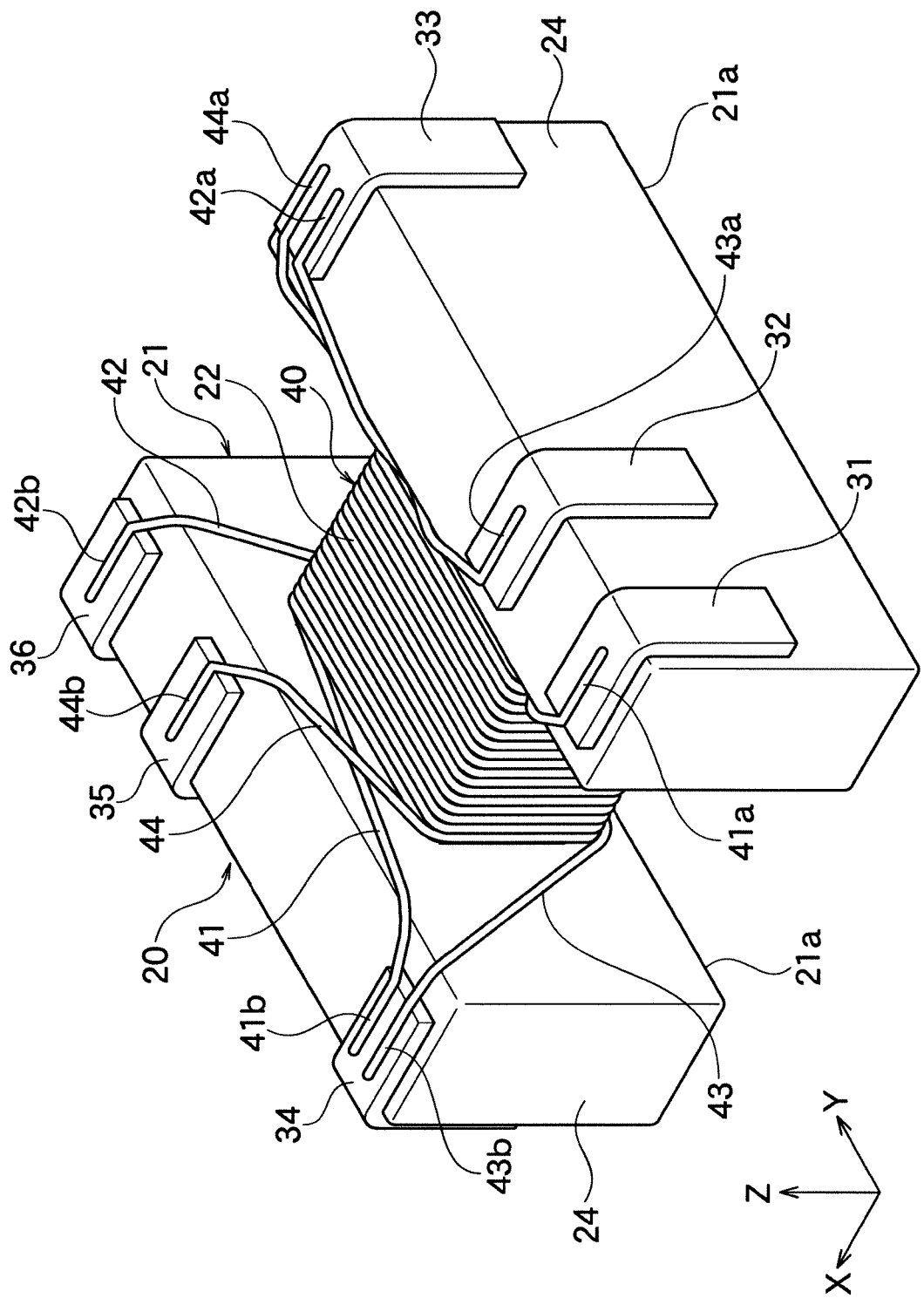
FIG. 2A is a perspective view of a coil device as an electronic device manufactured using the thermocompression apparatus shown in FIG. 1A.

First, the coil device 20 according to the present embodiment shown in FIG. 2A is described. The coil device 20 is used as, for example, a surface-mount type pulse transformer. The coil device 20 includes the core 21 and a coil portion 40. The core 21 is a drum type core. The coil portion 40 is wound around a winding portion 22 of the core 21. The core 21 includes the winding portion 22 having a bar shape and a pair of flanges 24 and 24 arranged on both ends of the winding portion 22 in the X-axis direction.

The flanges 24 have an approximately rectangular-parallelepiped outer shape. The pair of flanges 24 is arranged to be approximately parallel to each other with a predetermined space in the X-axis direction. The winding portion 22 is connected with approximately central areas of surfaces of the pair of flanges 24 facing each other. The winding portion 22 has a rectangular cross section in the present embodiment, but may have any cross sectional shape, such as polygon, circle, and ellipse.

In the present embodiment, the bottom surfaces 21a of the core 21 in the Z-axis direction are also bottom surfaces of the flanges 24 and are antimounting surfaces in using the coil device 20. The bottom surfaces 21a may be connected with a bar core after the coil portion 40 is formed. The bar core produces a magnetic path continuous to the core 21. Instead of the bard core composed of a magnetic material, a magnetic member, such as a magnetic sheet and a magnetic film, may be attached to the bottom surfaces 21a. Alternatively, a nonmagnetic member, such as resin sheet, resin plate, and resin film, may be attached to the bottom surfaces 21a.

Terminal portions 31 to 36 are arranged on the top surface of each flange 24 of the core 21 in the Z-axis direction. The terminal portions 31 to 36 are constituted by a metal fitting having an approximately L outer shape, a metal film (e.g. plating film), or a conductive resin, and at least some of the terminal portions 31 to 36 are arranged on the top surfaces of the flanges 24. Incidentally, the top surfaces of the flanges 24 are a mount surface to a circuit board or so in using the coil device 20.

The three terminal portions 31 to 33 are arranged on one of the flanges 24, and the other three terminal portions 34 to 36 are arranged on the other flange 24. The adjacent terminal portions are not arranged at equal intervals. The interval between the terminal portion 32 and the terminal portion 33 is configured to be wider than the interval between the terminal portion 31 and the terminal portion 32. The interval between the terminal portion 34 and the terminal portion 33 is configured to be wider than the interval between the terminal portion 33 and the terminal portion 36.

The coil portion 40 is formed around the winding core 22 of the core 21. The coil portion 40 consists of four wires 41 to 44. The wires 41 to 44 are constituted by, for example, a coated wire where a core material of good conductor is covered with an insulation film, and the wires 41 to 44 are wound around the winding core 22, for example, by double-layer structure.

Figure 2B:
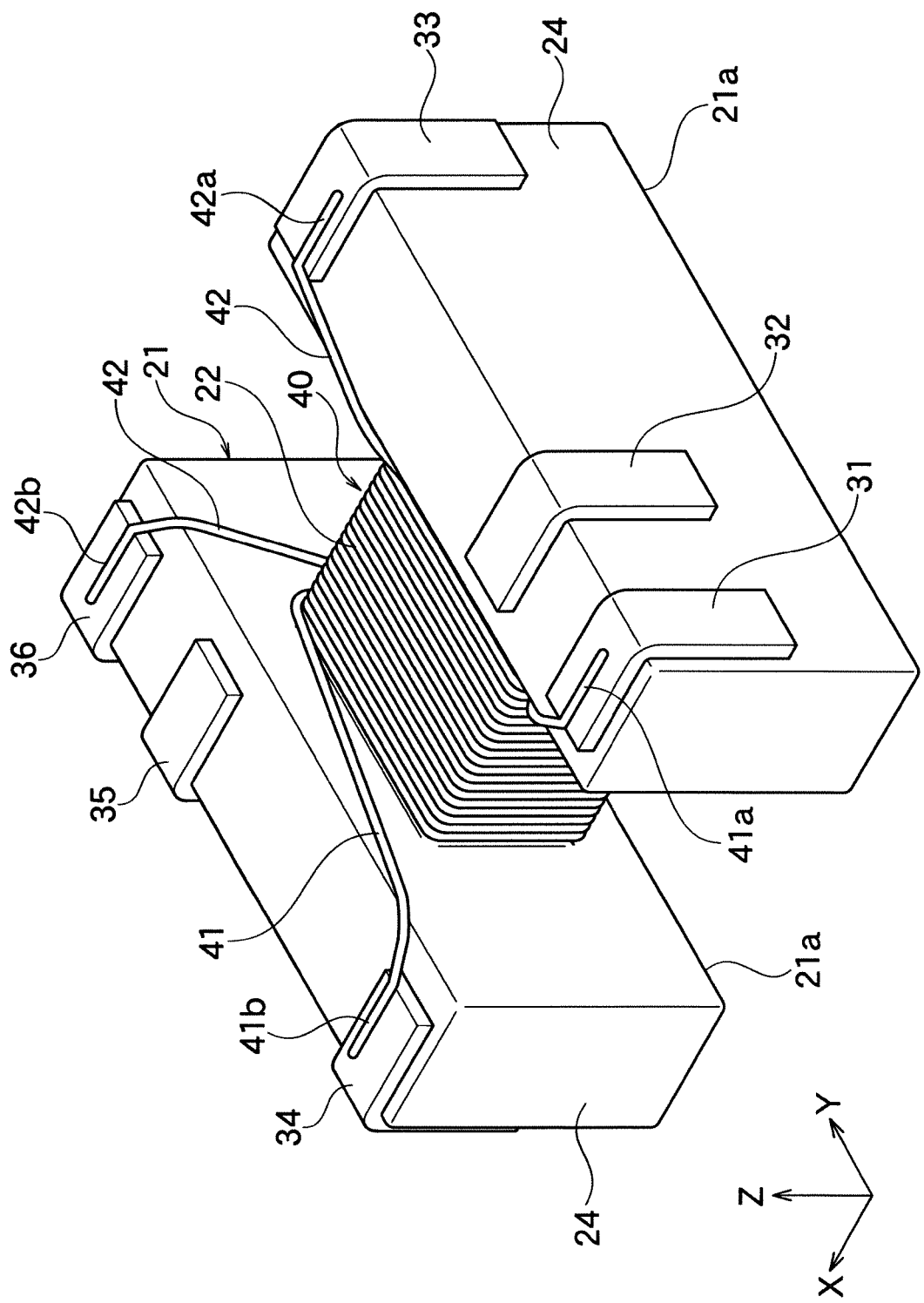
FIG. 2B is a perspective view showing a step in the middle of manufacturing the coil device shown in FIG. 2A.

As shown in FIG. 2B, the first wire 41 and the second wire 42 are wound by normal bifilar winding so as to constitute a first-layer group in the first layer, and the third wire 43 and the fourth wire 44 are subsequently wound by normal bifilar winding so as to constitute a second-layer group in the second layer. In the present embodiment, the wires 43 and 44 of the second-layer group and the wires 41 and 42 of the first-layer group are wound in the reverse direction. All of the winding numbers of the wires 41 to 44 are the same, but may be different.

Incidentally, the wires 41 to 44 are constituted by wires having the same diameter in the present embodiment, but may be constituted by wires having different diameters. Preferably, the wires 41 and 44 have a diameter of 20 to 50 µm.

As shown in FIG. 2A, wire ends 41a and 41b of the first wire 41 are respectively connected with the terminal portions 31 and 34, wire ends 42a and 42b of the second wire 42 are respectively connected with the terminal portions 33 and 36, wire ends 43a and 43b of the third wire 43 are respectively connected with the terminal portions 32 and 34, and wire ends 44a and 44b of the fourth wire 44 are respectively connected with the terminal portions 33 and 35.

In the manufacture of the coil device 20, firstly prepared are the wires 41 to 44 and the drum core 21 with the terminal portions 31 to 36. For example, the core 21 is manufactured by molding and sintering a magnetic material having a comparatively high permeability, such as Ni—Zn based ferrite and Mn—Zn based ferrite, or a magnetic powder composed of metal magnetic material. The metal terminal portions 31 to 36 are fixed to the flanges 24 of the core 21 by adhesion or so. Incidentally, the terminal portions 31 to 36 may be provided on the flanges 24 in such a manner that a conductive film is formed on the core 21 by printing, plating, or the like and is baked.

For example, the wires 41 to 44 may be prepared in such a manner that a core material composed of a good conductor of copper (Cu) or so is covered with an insulation material composed of imide metamorphosed polyurethane, and that the outermost surface is covered with a thin resin film of polyester or so. The wires 41 to 44 and the core 21 with the terminal portions 31 to 36 prepared are put in a winding machine, and the wires 41 to 44 are wound around the winding core 22 of the core 21 in a predetermined order.

In the present embodiment, the first wire 41 and the second wire 42 are wound by bifilar winding so as to form the first-layer group, and the third wire 43 and the fourth wire 44 are subsequently wound by bifilar winding so as to form the second-layer group. The wire ends 41a and 44a and 41b to 44b of the wound wires 41 to 44 are fixed to the predetermined terminal portions 31 to 36 by thermocompression.

Figure 1B:
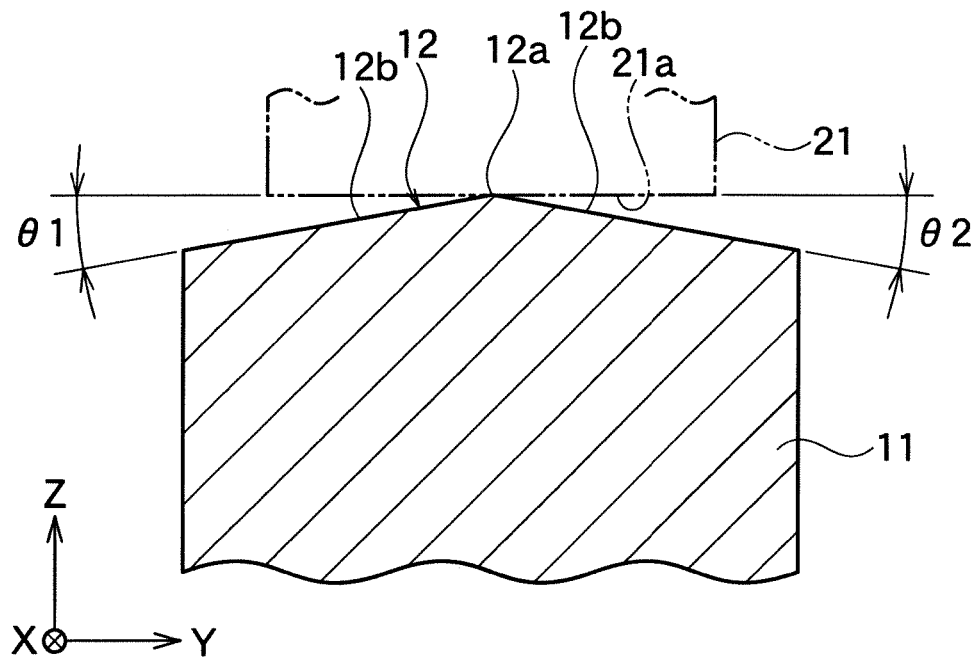
FIG. 1B is a cross-sectional view of a main part of the thermocompression apparatus shown in FIG. 1A.

For example, the wire ends 41a and 44a and 41b to 44b of the wires 41 to 44 mentioned above can be bonded by thermocompression against the predetermined terminal portions 31 to 36 using the thermocompression apparatus 2 shown in FIG. 1A. As shown in FIG. 1B, the installation surface 12 of the thermocompression apparatus 2 includes a maximum convex 12a and a pair of slope surfaces 12b. The maximum convex 12a contacts with the bottom surfaces 21a of the core 21 as component. In the pair of slope surfaces 12b, the height in the Z-axis direction decreases gradually from the maximum convex 12a toward both sides in the Y-axis direction (width direction).

Figure 1C:
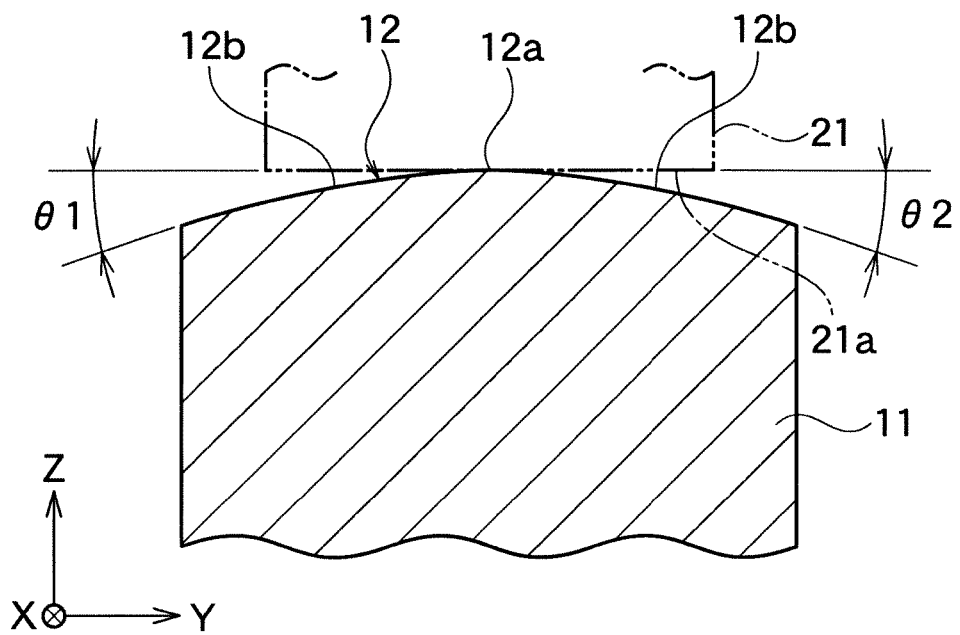
FIG. 1C is a cross-sectional view of a main part similar to FIG. 1B of a thermocompression apparatus according to another embodiment of the present invention.

The maximum convex 12a is formed in the middle of the installation surface 12 in the Y-axis direction in the present embodiment, but is not necessarily formed in the middle of the installation surface 12 in the Y-axis direction. In the present embodiment, the maximum convex 12a is an apex of an obtuse triangle and is linearly continuous in parallel to the X-axis direction. Each of the slope surfaces 12b is formed approximately linearly on a vertical cross section to the X-axis. Incidentally, as shown in FIG. 1C, the maximum convex 12a may be an apex of an arc surface and may be linearly continuous in the X-axis direction. Each of the slope surfaces 12b may be a curved surface of generally arc on a vertical cross section to the X-axis direction.

Tilt angles $\theta1$ and $\theta2$ of the slope surfaces 12b from the maximum convex 12a may be different from each other, but are preferably approximately equal to each other. Preferably, each of the tilt angles is larger than an angle where the flanges 24 of the core 21 slantly rotate and move with the maximum convex 12a as a fulcrum by a tip 4a of the heater chip 4.

Each of the tilt angles θ1 and θ2 is determined based on manufacturing variation of the core 21 as component, mounting accuracy of the terminal portions, and the like, and is preferably in a range of 1 to 3 degrees. Incidentally, each of the tilt angles θ1 and θ2 represents how inclined a line connecting between the maximum convex 12a and a position of each of the slope surfaces 12b disposed right below the end of the core 21 in the Y-axis direction is to the Y-axis within the width range of the core 21 as component in the Y-axis direction. In the present embodiment, the Y-axis is approximately parallel to the longitudinal direction of the tip 4a of the heater chip 4 and is approximately perpendicular to the press direction by the heater chip 4.

As shown in FIG. 3, the heater chip 4 is disposed to be freely movable to and from the wire ends 41a and 42a, which are scheduled portions of thermocompression of the core 21 as component disposed opposite to the installation surface 12, and the heater chip 4 can heat and press the wire ends 41a and 42a against the terminal portions 31 and 33. An electric current flows through the heater chip 4 from the chip support drive portion 6, and the heater chip 4 is resistive heated. The heater chip 4 is heated to any temperature, such as 400 to 550° C. Due to the chip support drive portion 6, the heater chip 4 may be relatively movable to the installation surface 12 in the Z-axis direction, the Y-axis direction, and the X-axis direction.

Figure 4A:
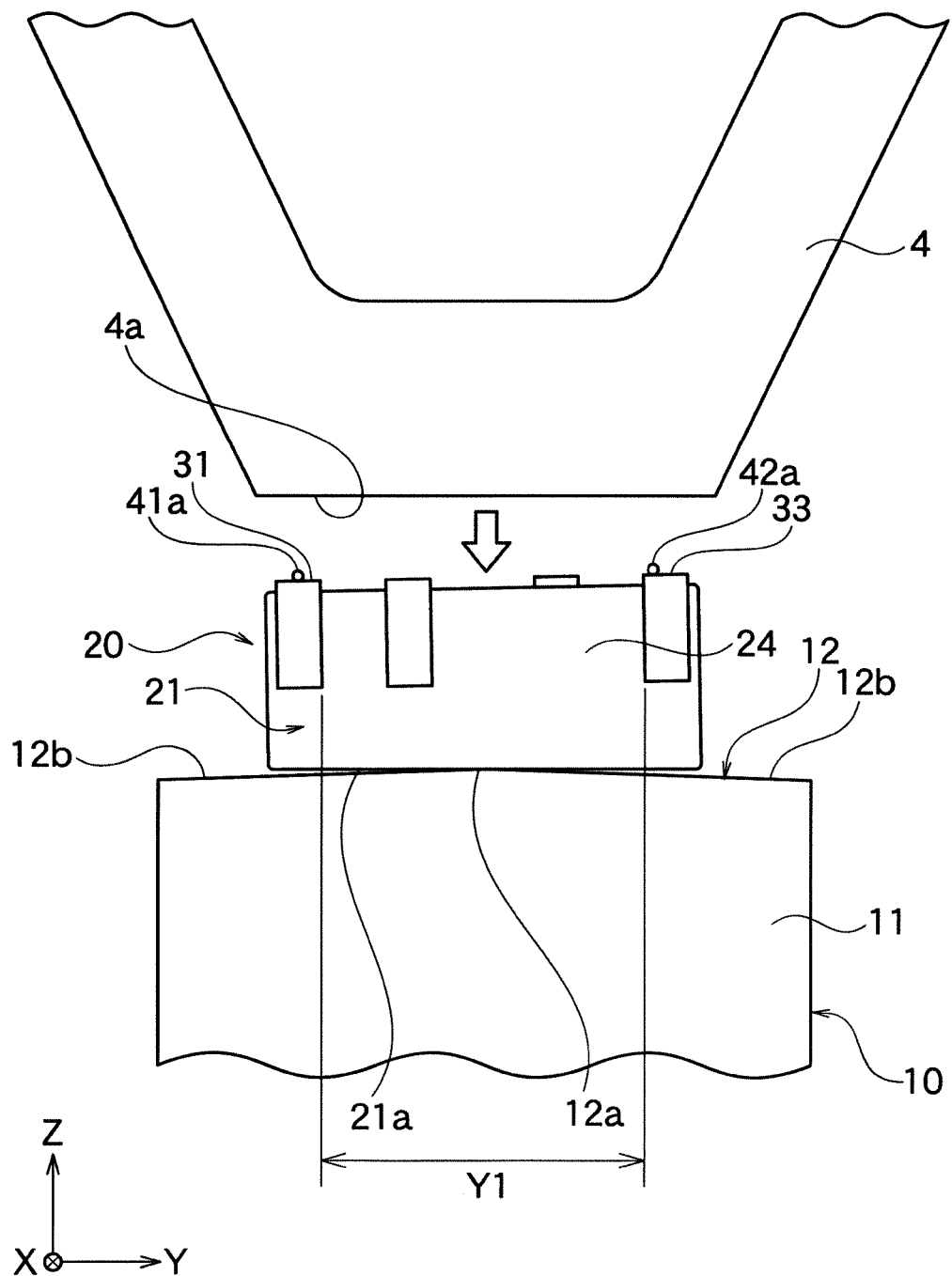
FIG. 4A is a partial front view showing a motion of the thermocompression apparatus shown in FIG. 3.

The following is an explanation of thermocompression of the wire ends (scheduled portions of thermocompression) 41a and 42a against the terminal portions 31 and 33 of the core 21 as component using the thermocompression apparatus 2 according to the present embodiment. As shown in FIG. 4A, the following explanation presumes that the height of the terminal portions 31 and 33, which are formed on the flange 24 of the core 21, from the bottom surface 21a in the Z-axis direction changes based on manufacturing errors or so. Initially, the tip (lower end in the Z-axis direction) 4a of the heater chip 4 approaches the scheduled portions of thermocompression of the coil ends 41a and 43a arranged opposite to the installation surface 12 of the stage 10. Then, the tip 4a of the heater chip 4 contacts with only the wire end 42a, which is one of the scheduled portions of thermocompression whose height from the bottom surface 21a in the Z-axis direction is larger.

Figure 4B:
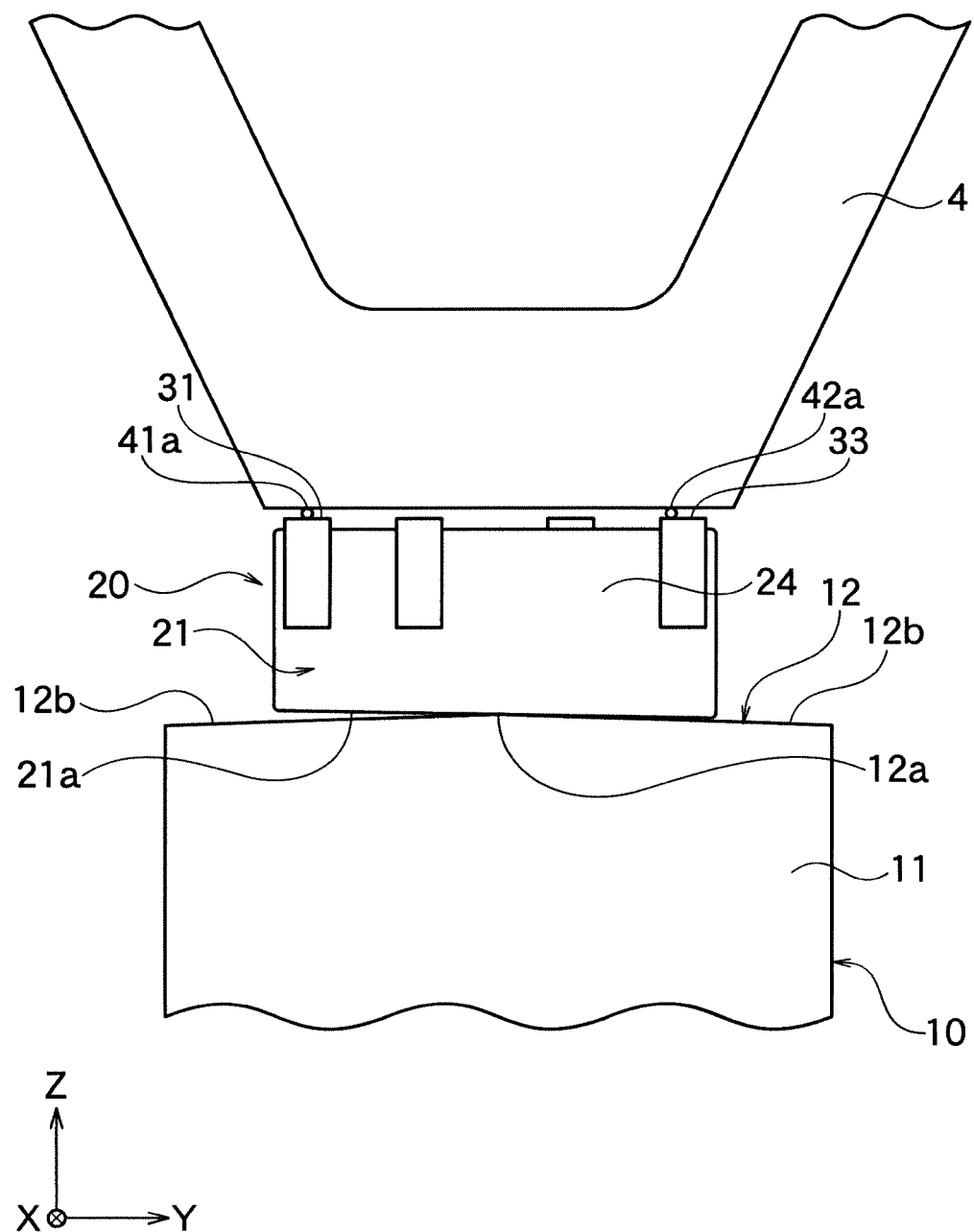
FIG. 4B is a partial front view showing a continuous motion of the thermocompression apparatus shown in FIG. 4A.

Moreover, the heater chip 4 is pushed against the installation surface 12, and the flange 24 of the core 21 tilts from the maximum convex 12a of the installation surface 12 toward one of the slope surfaces (right slope surface in FIG. 4A and FIG. 4B) 12b, whereby the wire end 41a, which is the other scheduled portion of thermocompression, is moved closer to the tip 4a of the heater chip 4. Thus, as shown in FIG. 4B, both of the wire ends 41a and 42a can be favorably heated and pressed at the same time and can be bonded by thermocompression against the respective terminal portions 31 and 33, while the tip 4a of the heater chip 4 is in contact with the wire ends 41a and 42a, which are scheduled portions of thermocompression arranged on both sides of the maximum convex 12a of the installation surface 12 in the Y-axis direction.

In the thermocompression apparatus 2 according to the present embodiment, the core 21 thereby slantly rotates and moves on the installation surface 12 of the stage 10 with the maximum convex 12a of the installation surface 12 as a fulcrum in pushing the tip 4a of the heater chip 4 against the wire ends 41a and 42a, even if manufacturing errors or so occur in the core 21 as component or the terminal portion 31 or 33. That is, the heater chip 4 presses the wire end 42a of the core 21, and this motion thereby slantly rotates and moves the core 21 with the maximum convex 12a of the installation surface 12 as a fulcrum, and moves the wire end 41a closer to the tip 4a of the heater chip 4. Thus, the wire ends 41a and 43a are positioned in a self-alignment manner with respect to the tip 4a of the heater chip 4.

Thus, the wire ends 41a and 42a, which are scheduled portions of thermocompression arranged on both sides of the maximum convex 12a of the installation surface 12, favorably contact with the tip 4a of the heater chip 4 at the same time, and thermocompression failure or so can be thereby prevented effectively. In the thermocompression apparatus 2 according to the present embodiment, the tip 4a of the heater chip 4 and the wire ends 41a and 42a are not positioned by a tracking movement of the heater chip 4 but by moving the core 21, which is smaller than the heater chip 4, in a self-alignment manner, and tracking properties of the positioning are thereby improved. It is unfavorable to control a minute movement of the heater chip 4, which is comparatively large, based on manufacturing errors and distortion of the core 21 or the terminal portions 31 and 33, because this complicates controlling and also complicates a connection mechanism between the heater chip 4 and the mechanism supporting it.

In the present embodiment, the coil device 20 is placed on the installation surface 12 so that the wire ends 41a and 42a are respectively arranged on both sides of the maximum convex 12a in the Y-axis (width) direction. That is, the coil device 20 is placed on the installation surface 12 so that the maximum convex 12a is disposed in the width Y1 in the Y-axis direction between the terminal portions 31 and 33 configured to be bonded with the wire ends 41a and 42a respectively by thermocompression. When such an arrangement is employed, the wire ends 41a and 42a, which are a plurality of scheduled portions of thermocompression, can be simultaneously and favorably bonded with the respective terminal portions 31 and 33 by thermocompression.

The method of manufacturing the electronic device according to the present embodiment includes at least the following steps. That is, prepared is the core 21 having a plurality of wire ends 41a and 42a to be bonded by thermocompression. Next, the core 21 is placed on the installation surface 12 so that the wire ends 41a and 42a are arranged on both sides in the Y-axis direction of the maximum convex 12a formed on the installation surface 12 of the stage 10. As shown in FIG. 4A, the tip 4a of the heater chip 4 thereafter approaches the wire ends 41a and 42a of the core 21 arranged opposite to the installation surface 12 of the stage 10 in the Z-axis direction.

Then, the tip 4a of the heater chip 4 contacts with the wire end 42a, which is one of scheduled portions of thermocompression, the core 21 slantly rotates and moves from the maximum convex 12a of the installation surface 12 toward one of the slope surfaces 12b, and the wire end 41a, which is the other scheduled portion of thermocompression, moves closer to the tip 4a of the heater chip 4. As shown in FIG. 4B, both of the wire ends 41a and 42a can be subsequently bonded by thermocompression with the respective terminal portions 31 and 33 by being heated and pressed, while the tip 4a of the heater chip 4 is in contact with the wire ends 41a and 42a on both sides of the maximum convex 12a of the installation surface 12 in the Y-axis direction.

In the method of manufacturing the coil device (pulse transformer) 20 as an electronic device according to the present embodiment, the coil device 20 slantly rotates and moves on the installation surface 12 of the stage 10 with the maximum convex 12a of the installation surface 12 as a fulcrum in pushing the tip 4a of the heater chip 4 against the scheduled portion of thermocompression, even if manufacturing errors or so occur in components constituting the coil device 20. That is, when the tip 4a of the heater chip 4 presses one of the scheduled portions of thermocompression of the coil device 20, the coil device 20 slantly rotates and moves with the maximum convex 12a of the installation surface 12 as a fulcrum, the other scheduled portion of thermocompression moves closer to the tip 4a of the heater chip 4, and the scheduled portions of thermocompression are positioned in a self-alignment manner with respect to the heater chip 4.

Thus, the scheduled portions of thermocompression arranged on both sides of the maximum convex 12a of the installation surface 12 simultaneously and favorably contact with the heater chip 4, and thermocompression failure or so can be thereby prevented effectively.

Incidentally, the above-mentioned embodiment shows that the thermocompression between the wire end 41a and the terminal portion 31 and the thermocompression between the wire end 42a and the terminal portion 33 are carried out at the same time using the thermocompression apparatus 2 as shown in FIG. 4A and FIG. 4B, but the thermocompression between the wire end 41b and the terminal portion 34 and the thermocompression between the wire end 42b and the terminal portion 36 can be carried out similarly at the same time.

Figure 5A:
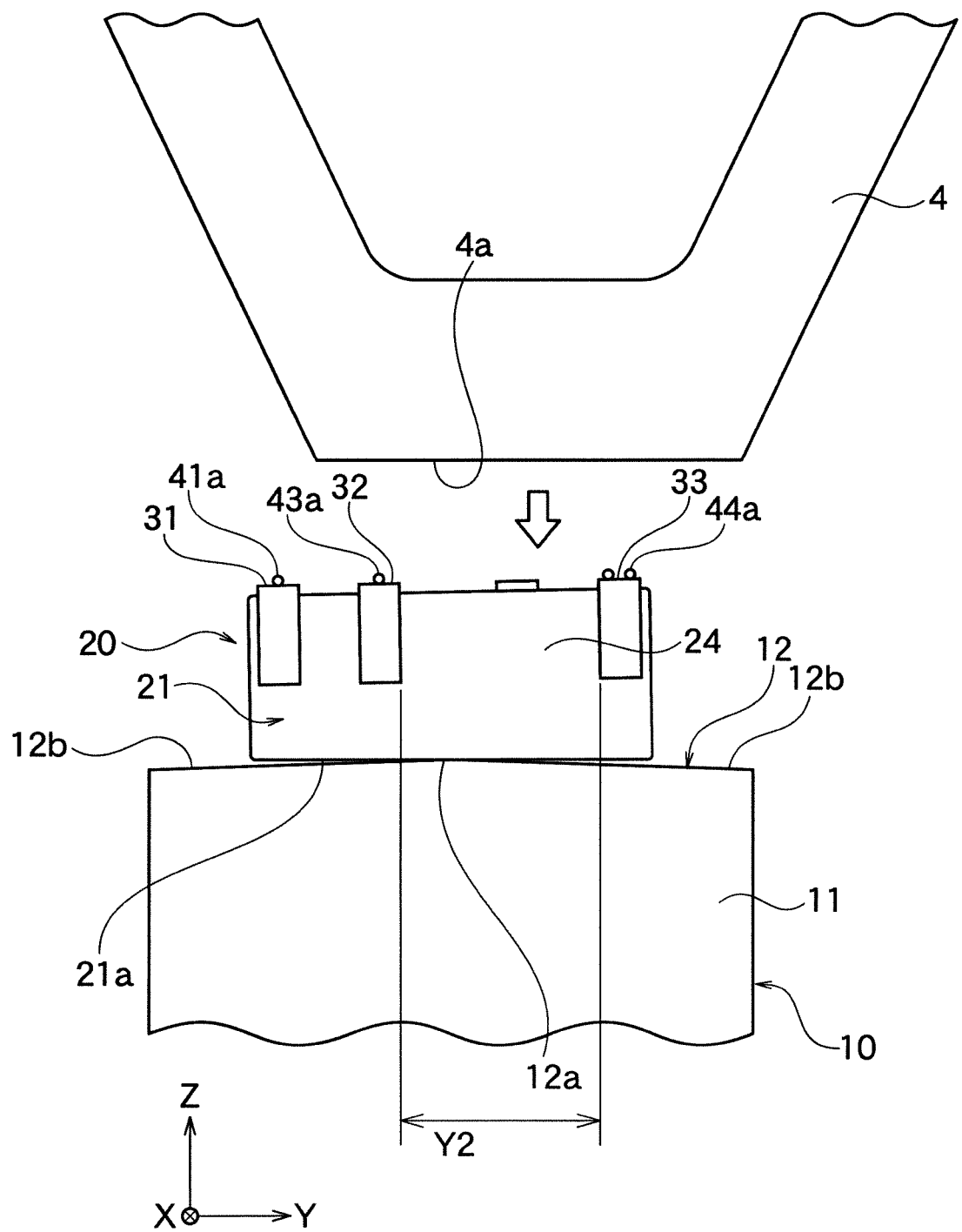
FIG. 5A is a partial front view showing a continuous motion of the thermocompression apparatus shown in FIG. 4B.
Figure 5B:
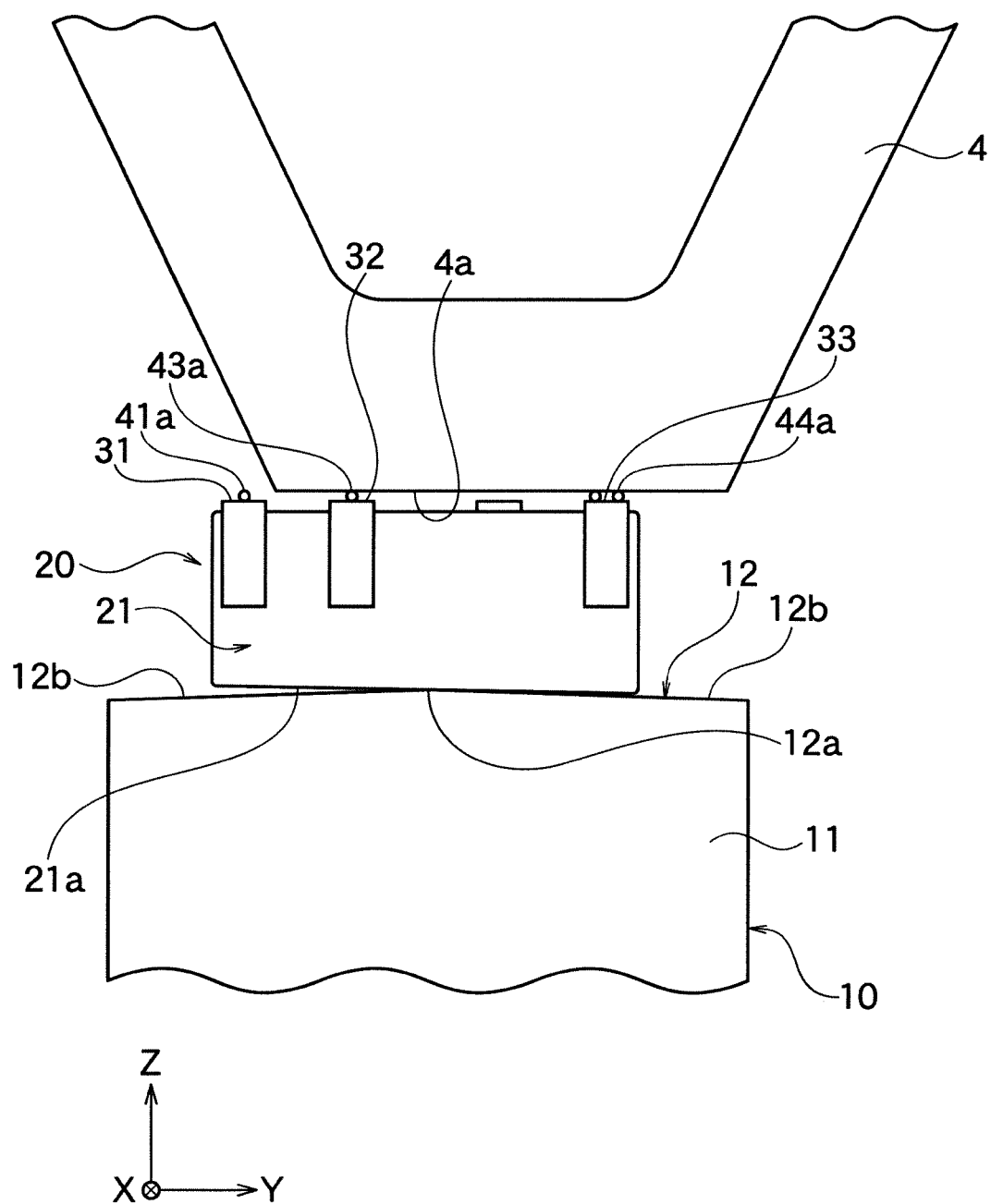
FIG. 5B is a partial front view showing a continuous motion of the thermocompression apparatus shown in FIG. 5A.

Moreover, when the coil portion 40 in the first layer is formed by the wires 41 and 42 as shown in FIG. 2B and the coil portion 40 in the second layer is thereafter formed by the wires 43 and 44 as shown in FIG. 2A, the thermocompression between the wire end 43a and the terminal portion 32 and the thermocompression between the wire end 44a and the terminal portion 33 may be carried out at the same time similarly to the above-mentioned manner as shown in FIG. 5A and FIG. 5B. Likewise, the thermocompression between the wire end 43b and the terminal portion 34 and the thermocompression between the wire end 44b and the terminal portion 35 shown in FIG. 2A may be carried out at the same time similarly to the above-mentioned manner.

Incidentally, as shown in FIG. 5A, the coil device 20 is placed on the installation surface 12 so that the maximum convex 12a is disposed in the width Y2 in the Y-axis direction between the terminal portions 32 and 33 configured to be respectively bonded with the wire ends 43a and 44a by thermocompression. As shown in FIG. 5B, thermocompression is preferably carried out so that the tip 4a of the heater chip 4 does not contact with the wire end 41a, which has already been bonded by thermocompression, as much as possible.

Second Embodiment

Figure 6:
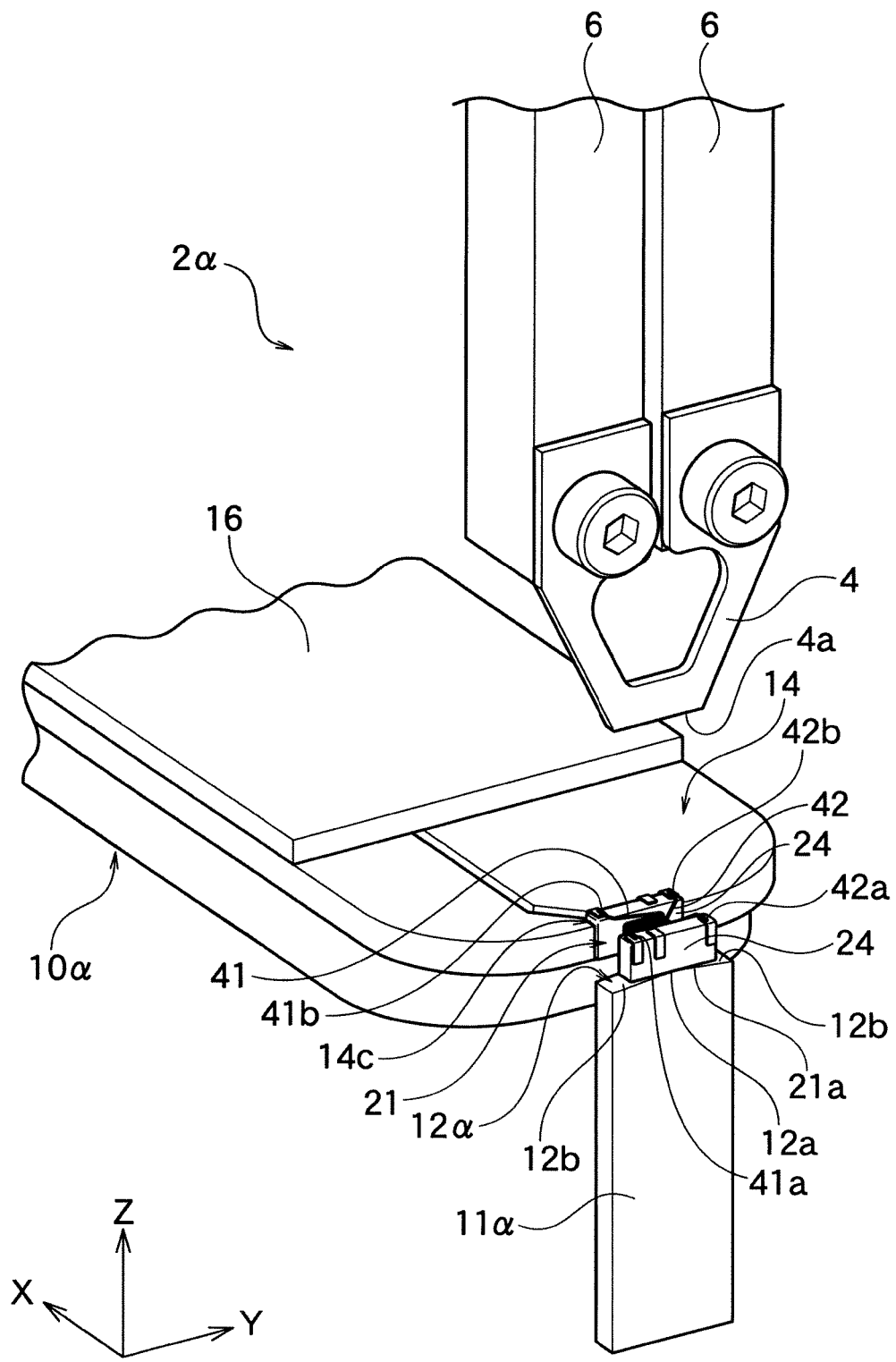
FIG. 6 is a perspective view of a main part of a thermocompression apparatus according to another embodiment of the present invention.

As shown in FIG. 6, a thermocompression apparatus 2α of the present embodiment is the same as the thermocompression apparatus 2 of First Embodiment except for the following explanation, and overlapped matters are not explained. In the present embodiment, a movable installation surface 12α is formed on a top surface of a movable installation stand 11α. The movable installation surface 12α is separately movable to an installation surface formed on a concave portion for chuck 14c of a stage 10α.

In the present embodiment, the maximum convex 12a and the pair of slope surfaces 12b are not necessarily formed on an installation surface configured to be contacted with the bottom surface of the flange 24 held by the concave portion for chuck 14c of the stage 10α, but are preferably formed. The thermocompression by the heater chip 4 may be also carried out on the installation surface similarly to the above-mentioned embodiment.

In the present embodiment, the maximum convex 12a and the pair of slope surfaces 12b are formed on the movable installation surface 12α. In this configuration, the movable installation stand 11α with the movable installation surface 12α can be separated from the core 21 as component after the wire ends 41b and 42b are bonded by thermocompression on the installation surface disposed on the concave portion for chuck 14c of the stage 10a using the heater chip 4 similarly to the above-mentioned embodiment.

After the tip 4a of the heater chip 4 is separated from the core 21, for example, the concave portion for chuck 14c of the chuck mechanism 14 can detachably hold one of the flanges 24 of the core 21, and the chuck mechanism 14 can rotate the core 21. In this case, the winding operation of the wires 41 and 42 can be continuously carried out after the connecting work of the wires by thermocompression, and work efficiency can be improved.

Then, when the movable installation stand 11α is moved in the Z-axis direction and the movable installation surface 12a of the movable installation stand 11α contacts with the bottom surface 21a of the other flange 24, the wire ends 41a and 42a can be bonded by thermocompression similarly to the above-mentioned embodiment.

In the present embodiment, the thermocompression apparatus 2α further includes a rotation mechanism that rotates the chuck mechanism 14 around the core axis of the winding core 22 of the core 21. Other features and effects of the thermocompression apparatus 2α of the present embodiment are the same as those of First Embodiment, and are not explained in detail.

Third Embodiment

Figure 7A:
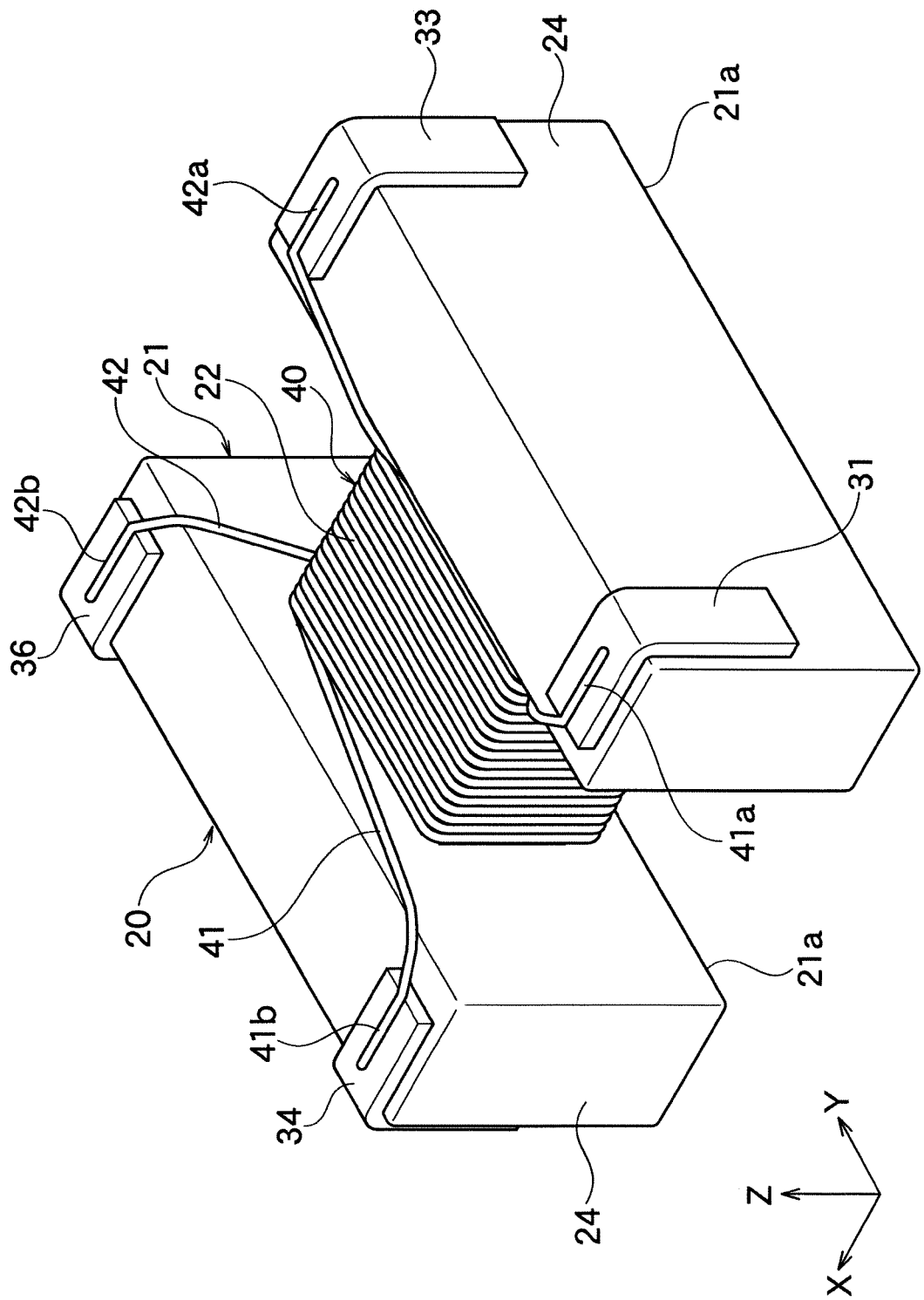
FIG. 7A is a perspective view of a coil device as an electronic device according to another embodiment.
Figure 8A:
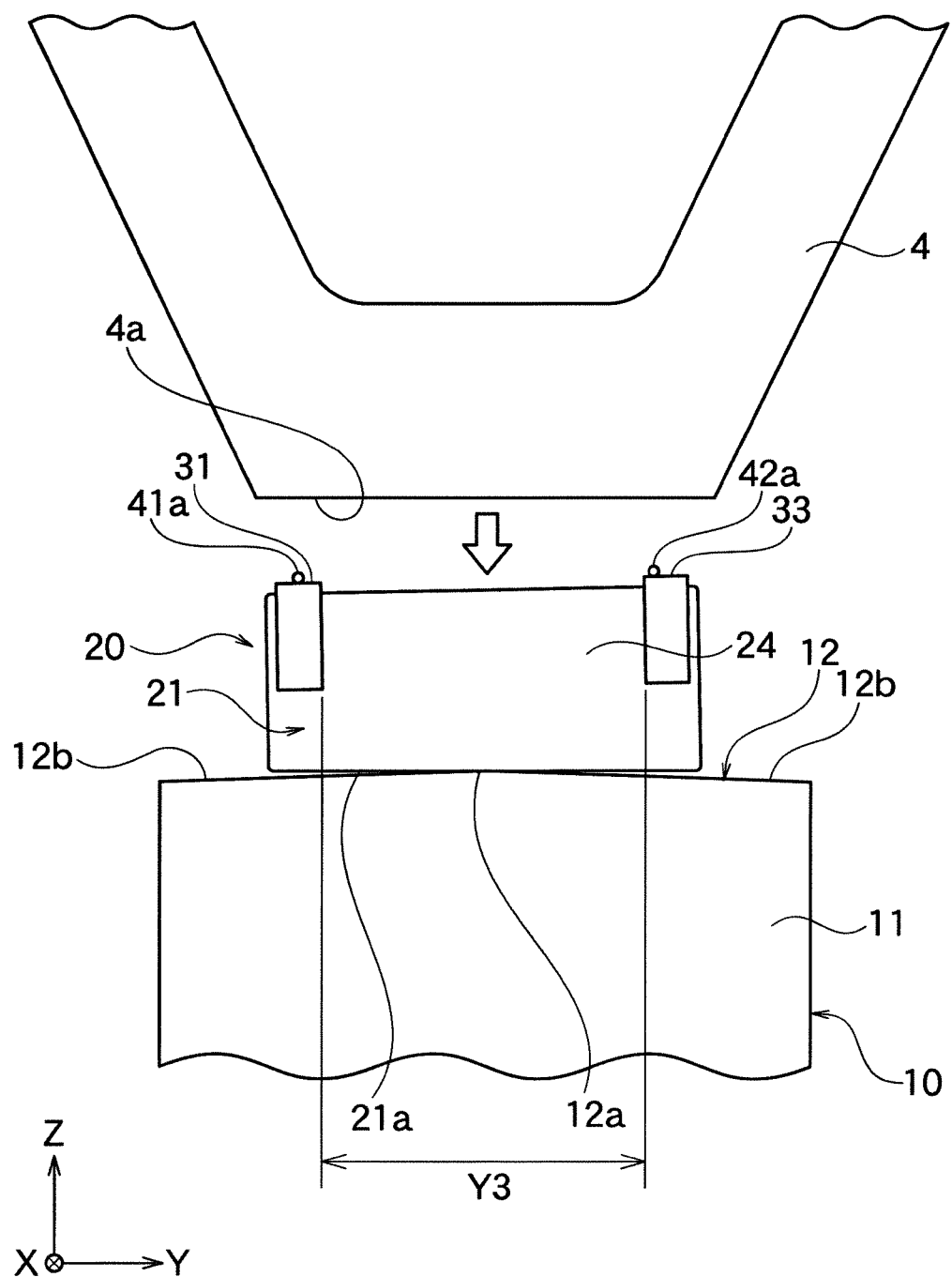
FIG. 8A is a partial front view corresponding to FIG. 4A in bonding the coil device shown in FIG. 7A by thermocompression.

As shown in FIG. 7A and FIG. 8A, the present embodiment is similar to First Embodiment or Second Embodiment except for the following matters, and overlapped matters are not explained. In the coil device 20 of the present embodiment, as shown in FIG. 7A, the two terminal portions 31 and 33 are arranged on both ends of one of the flanges 24 in the Y-axis direction, and the other two terminals 34 and 36 are arranged on the other flange 24.

The coil portion 40 is formed around the winding portion 22 of the core 21. The coil portion 40 consists of the two wires 41 and 42. The wires 41 and 42 are wound around the winding portion 22 by, for example, double-layer structure. As shown in FIG. 8A, the coil device 20 is placed on the installation surface 12 so that the maximum convex 12a is disposed in the width Y3 in the Y-axis direction between the terminal portions 31 and 33 configured to be respectively bonded with the wire ends 41a and 42a by thermocompression.

Fourth Embodiment

Figure 7B:
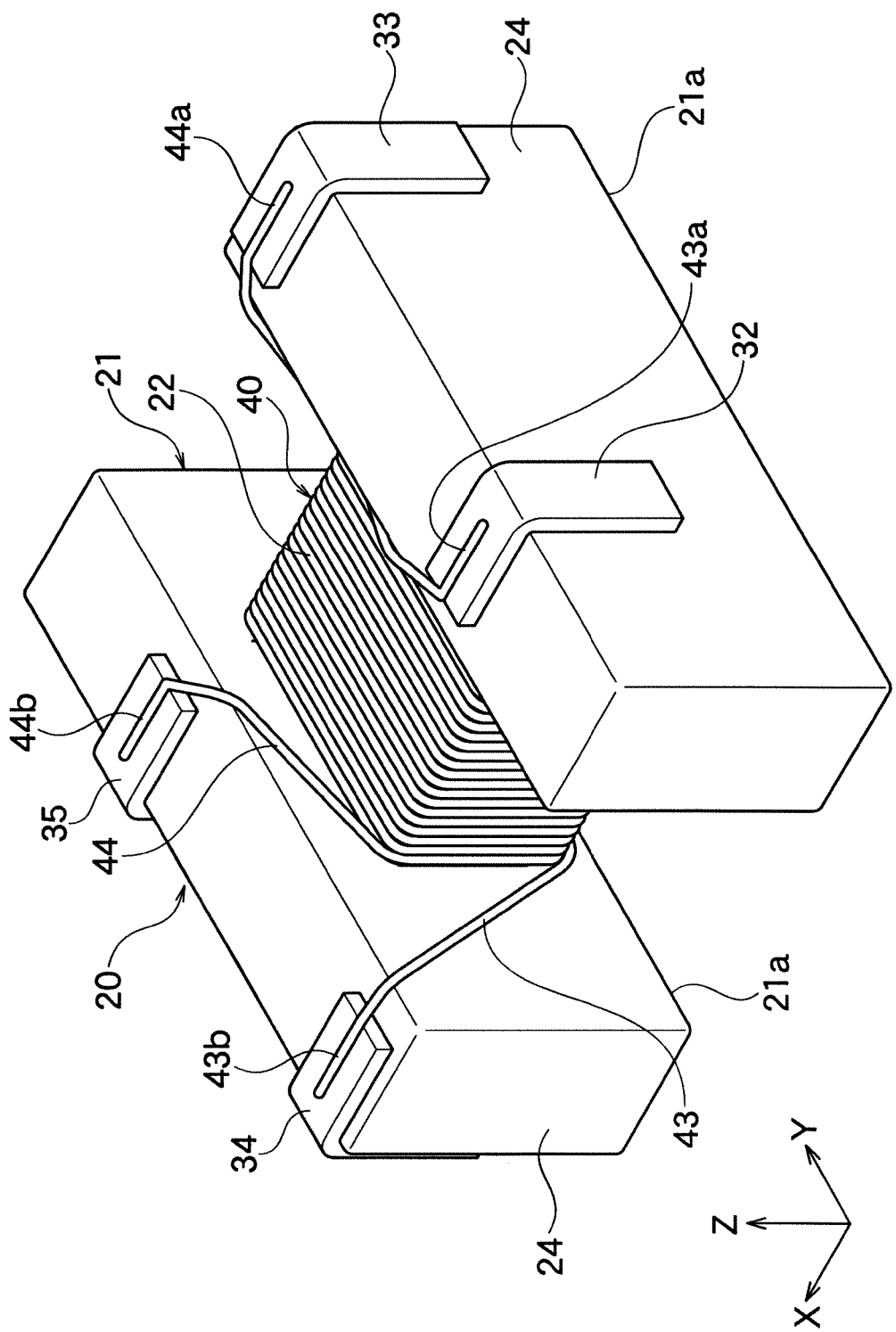
FIG. 7B is a perspective view of a coil device as an electronic device according to further another embodiment.
Figure 8B:
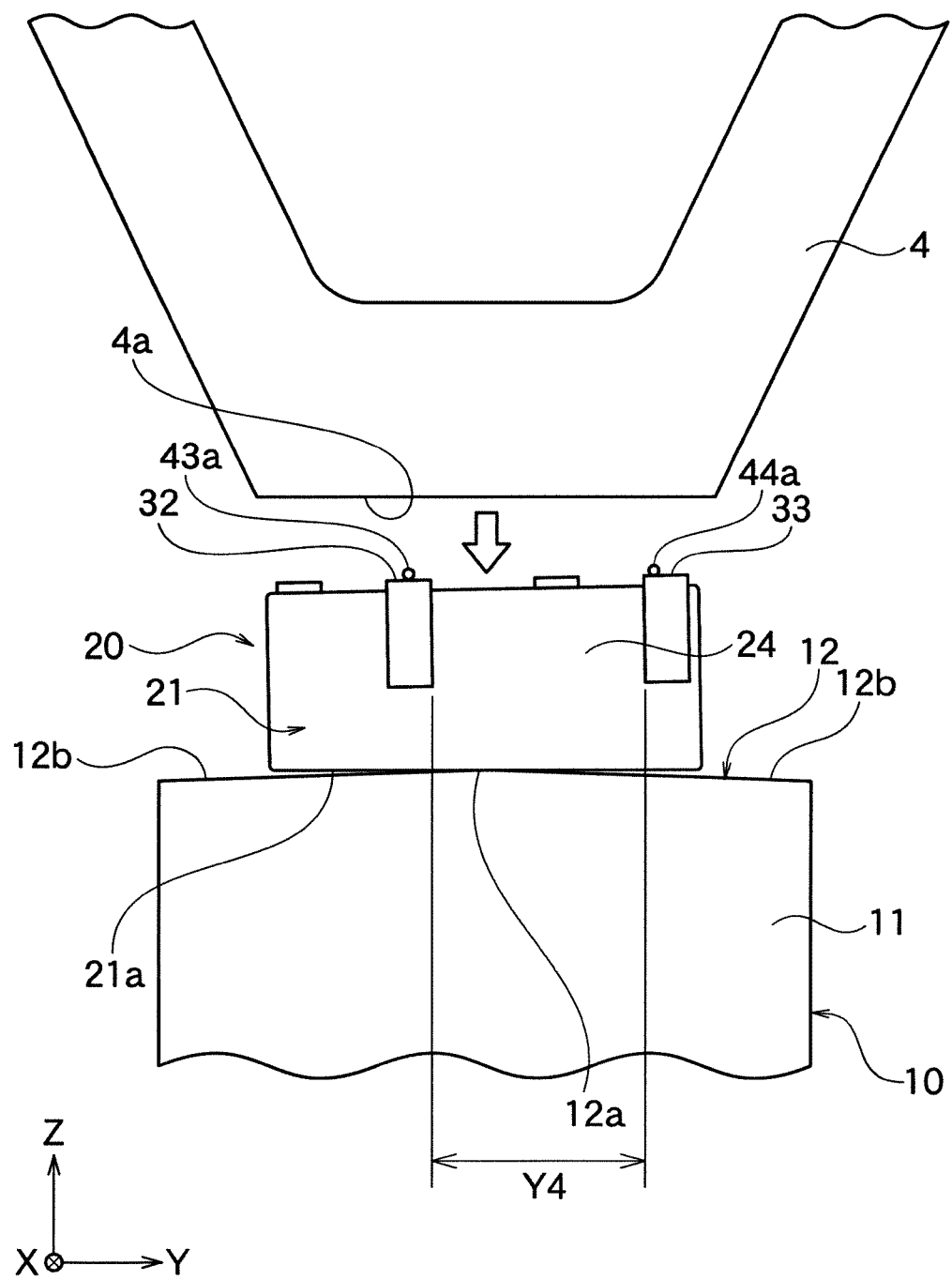
FIG. 8B is a partial front view corresponding to FIG. 4A in bonding the coil device shown in FIG. 7B by thermocompression.

As shown in FIG. 7B and FIG. 8B, the present embodiment is similar to First Embodiment or Second Embodiment except for the following matters, and overlapped matters are not explained. In the coil device 20 of the present embodiment, as shown in FIG. 7B, the two terminal portions 32 and 33 are separately arranged on one of the flanges 24 with a predetermined distance in the Y-axis direction, and the other two terminal portions 34 and 35 are arranged on the other flange 24. The terminal portions 33 and 34 are arranged at the end of each flange 24 in the Y-axis direction, and the terminal portions 32 and 35 are arranged closer to the middle of each flange 24 away from its end in the Y-axis direction.

The coil portion 40 is formed around the winding portion 22 of the core 21. The coil portion 40 consists of the two wires 43 and 44. The wires 43 and 44 are wound around the winding portion 22 by, for example, double-layer structure. As shown in FIG. 8B, the coil device 20 is placed on the installation surface 12 so that the maximum convex 12a is disposed in the width Y4 in the Y-axis direction between the terminal portions 32 and 33 configured to be respectively bonded with the wire ends 43a and 44a by thermocompression.

Incidentally, the present invention is not limited to the above-mentioned embodiments, and may be variously changed within the scope of the present invention.

For example, the component bonded by thermocompression using the thermocompression apparatus 2 or 2α of the present invention is not limited to electronic devices of the coil device 20, such as common mode filters and inductors, and may be other devices. The method of the present invention may also be used for attachment of wiring terminals to a mounting board.

The tip 4a of the heater chip 4 of the above-mentioned embodiments is a plane that is linear and parallel to the Y-axis direction and has a predetermined width in the X-axis direction, but this plane may only apply to a portion of the tip 4a contacting with the wire ends, and the rest of the tip 4a may have a concave curved surface or other concave portions.

The ridge of the maximum convex 12a is continuous and parallel to the X-axis direction in the above-mentioned embodiments, and the coil device 20 slantly rotates and moves most efficiently in this case, but the ridge of the maximum convex 12a is not necessarily completely parallel to the X-axis direction and may be tilted slightly.

NUMERICAL REFERENCES 2, 2α . . . thermocompression apparatus
4 . . . heater chip
6 . . . chip support drive portion
10, 10α . . . stage
11 . . . installation stand
11α . . . movable installation stand
12 . . . installation surface
12α . . . movable installation surface
12a . . . maximum convex
12b . . . slope surface
14 . . . chuck mechanism
14a, 14b . . . chuck piece
14c . . . chuck portion
16 . . . cover member
20 . . . coil device
21 . . . core
21a . . . bottom surface
22 . . . winding portion
24 . . . flange
31 to 36 . . . terminal portion
40 . . . coil portion
41 . . . first wire
42 . . . second wire
43 . . . third wire
44 . . . fourth wire

The invention claimed is:

1. A thermocompression apparatus, comprising:
a stage including an installation surface configured to receive and support an electronic device having a plurality of spaced scheduled portions as targets of thermocompression;
a heater chip configured to be movable into and out of contact with the plurality of spaced scheduled portions of the electronic device opposite to the installation surface of the stage when the electronic device is received and supported by the installation surface and configured to heat and press the plurality of spaced scheduled portions when in contact with the plurality of spaced scheduled portions; and
a chuck mechanism with a concave portion configured to mechanically engage and hold a part of the electronic device when the electronic device is received and supported by the installation surface,
wherein
the installation surface comprises:
an inner installation surface underlying a recess in the check mechanism formed by the concave portion; and
an outer installation surface outside the concave portion of the chuck mechanism that is not covered by the chuck mechanism;
the outer installation surface comprises:
a maximum convex configured to contact with a bottom surface of the electronic device when the electronic device is received and supported by the installation surface, the maximum convex being configured to be a fulcrum for pivot movement of the electronic device when the electronic device is received and supported by the installation surface and the heater chip contacts the electronic device, and
a pair of slope surfaces whose heights decrease from the maximum convex toward both sides of the installation surface in a width direction of the electronic device; and
the installation surface and the heater chip are configured such that
the bottom surface pivots on the maximum convex to make at least two of the plurality of spaced scheduled portions contact with the heater chip after the heater chip initially contacts and presses a first of the at least two of the plurality of spaced scheduled portions but not a second of the at least two of the plurality of spaced scheduled portions when the electronic device is received and supported by the installation surface and the heater contacts the electronic device.

2. The thermocompression apparatus according to claim 1, wherein the installation surface is configured such that, when the electronic device is received and supported by the installation surface, at least one of the plurality of spaced scheduled portions is on each side of the maximum convex in the width direction.

3. The thermocompression apparatus according to claim 1, wherein
the outer installation surface comprises a separately movable installation surface from the inner installation surface, and
the maximum convex and the pair of slope surfaces are on the movable installation surface.

4. The thermocompression apparatus according to claim 2, wherein
the outer installation surface comprises a separately movable installation surface from the inner installation surface, and
the maximum convex and the pair of slope surfaces are on the movable installation surface.

5. The thermocompression apparatus according to claim 1, wherein the outer installation surface and the inner installation surface are continuous.

6. The thermocompression apparatus according to claim 2, wherein the outer installation surface and the inner installation surface are continuous.

7. The thermocompression apparatus according to claim 1, wherein the chuck mechanism and the heater chip are configured such that the chuck mechanism loosens its holding of the electronic device when or before the heater chip contacts the plurality of spaced scheduled portions.

8. A thermocompression apparatus comprising:
a stage including an installation surface on which a component having a scheduled portion of thermocompression is placed;
a heater chip that is movable into and out of contact with the scheduled portion of thermocompression of the component opposite to the installation surface of the stage and configured to heat and press the scheduled portion of thermocompression; and
a chuck mechanism that is configured to hold the component,
wherein:
the installation surface comprises:
a maximum convex configured to contact a bottom surface of the component; and
a pair of slope surfaces whose heights decrease respectively from the maximum convex towards both sides of the installation surface in a width direction of the component, and
the chuck mechanism is configured to be rotated while holding the component.

9. The thermocompression apparatus according to claim 8, wherein the chuck mechanism is configured to loosen its holding of the component when or before the heater chip contacts the scheduled portion of thermocompression of the component.

10. A method of manufacturing an electronic device, comprising the steps of:
preparing a component having a plurality of scheduled portions of thermocompression;
placing the component on an installation surface of a stage so that one of the scheduled portions of thermocompression and the other scheduled portion of thermocompression are arranged on both sides of a maximum convex formed on the installation surface in a width direction thereof;
moving a heater chip closer to the scheduled portions of thermocompression of the component disposed opposite to the installation surface of the stage;
bringing the heater chip into contact with one of the scheduled portions of thermocompression, declining the component from the maximum convex toward one of slope surfaces of the installation surface, and moving the other scheduled portion of thermocompression closer to the heater chip; and
conducting thermocompression by heating and pressing both of the scheduled portions of thermocompression while the heater chip is in contact with the scheduled portions of thermocompression on both sides of the maximum convex of the installation surface.

11. A method of manufacturing an electronic device, comprising the steps of:
placing the electronic device of claim 1 on the installation surface of the stage of the thermocompression apparatus according to claim 1 so that one of the plurality of spaced scheduled portions of thermocompression is on each side of the maximum convex formed on the installation surface in the width direction;
bringing the heater chip into contact with one of the plurality of spaced scheduled portions of thermocompression and pivoting the electronic device about the maximum convex toward one of the pair of slope surfaces of the installation surface, such that another of the plurality of spaced scheduled portions of thermocompression is moved closer to the heater chip; and
conducting thermocompression by heating and pressing the plurality of spaced scheduled portions of thermocompression while the heater chip is in contact with the plurality of scheduled portions of thermocompression on both sides of the maximum convex of the installation surface.

12. The thermocompression apparatus according to claim 1, wherein the installation surface, the chuck mechanism and the heater chip are configured such that the heater chip contacts the plurality of spaced schedule portions above the outer installation surface when the electronic device is received and supported by the installation surface and the heater ship contacts the electronic device.

\* \* \* \* \*